(12) United States Patent
Zhou

(10) Patent No.: US 9,088,635 B2
(45) Date of Patent: Jul. 21, 2015

(54) METHOD AND SYSTEM FOR SHARING AUDIO AND/OR VIDEO

(75) Inventor: Yushen Zhou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 333 days.

(21) Appl. No.: 13/642,226

(22) PCT Filed: Apr. 19, 2011

(86) PCT No.: PCT/CN2011/072976
§ 371 (c)(1),
(2), (4) Date: Oct. 19, 2012

(87) PCT Pub. No.: WO2012/097549
PCT Pub. Date: Jul. 26, 2012

(65) Prior Publication Data
US 2013/0041973 A1 Feb. 14, 2013

(30) Foreign Application Priority Data

Jan. 18, 2011 (CN) .......................... 2011 1 0020124

(51) Int. Cl.
*H04L 12/54* (2013.01)
*H04L 29/06* (2006.01)
(Continued)

(52) U.S. Cl.
CPC ........ *H04L 65/605* (2013.01); *H04L 29/06176* (2013.01); *H04L 65/403* (2013.01); *H04M 3/567* (2013.01); *H04N 7/142* (2013.01);
(Continued)

(58) Field of Classification Search
CPC .. H04N 7/15; H04N 21/8547; H04N 21/6437
See application file for complete search history.

(56) References Cited

U.S. PATENT DOCUMENTS 6,842,836 B2 * 1/2005 Yun et al. ....................... 711/167
6,978,306 B2 * 12/2005 Miller et al. ................... 709/226
(Continued)

FOREIGN PATENT DOCUMENTS

CN 1848810 A 10/2006
CN 101150464 A 3/2008
(Continued)

OTHER PUBLICATIONS

International Search Report in international application No. PCT/CN2011/072976, mailed on Oct. 27, 2011.
(Continued)

*Primary Examiner* — Kevin Bates
*Assistant Examiner* — Jeyanath Jeyaratnam
(74) *Attorney, Agent, or Firm* — Oppedahl Patent Law Firm LLC

(57) ABSTRACT

The disclosure discloses a method for sharing audio and/or video. The method includes the steps that: a first terminal writes audio and/or video from an audio-video providing module into a cache space according to a play request of a second terminal, and transmits the audio and/or video stored in the cache space to the second terminal. The disclosure further discloses a system for sharing the audio and/or video. With the disclosure, a video conference of a mobile terminal can be displayed at a digital home network terminal in real time, so that the video content can be displayed through the digital terminal that does not support video conferences. Moreover, when a user gets home, a mobile phone terminal involved in the video conference can conveniently switch the images to a television terminal, thus not needing to be held by the user. Therefore, user experience is improved.

12 Claims, 2 Drawing Sheets

(51) Int. Cl.
*H04N 21/63* (2011.01)
*H04N 21/41* (2011.01)
*H04N 21/414* (2011.01)
*H04N 7/14* (2006.01)
*H04N 21/43* (2011.01)
*H04N 21/6437* (2011.01)
*H04M 3/56* (2006.01)
*H04L 12/70* (2013.01)

(52) U.S. Cl.
CPC .......... *H04N 7/147* (2013.01); *H04N 21/4104* (2013.01); *H04N 21/41407* (2013.01); *H04N 21/4307* (2013.01); *H04N 21/632* (2013.01); *H04N 21/6437* (2013.01); *H04L 2012/5681* (2013.01)

(56) References Cited

U.S. PATENT DOCUMENTS

| | | |
|---|---|---|
| 7,792,998 B2 | 9/2010 | Heo |
| 2002/0170067 A1* | 11/2002 | Norstrom et al. ............. 725/109 |
| 2008/0177865 A1 | 7/2008 | Heo |
| 2009/0307368 A1 | 12/2009 | Sriram |
| 2010/0281142 A1 | 11/2010 | Stoyanov |
| 2011/0055656 A1* | 3/2011 | Ben-Zedeff et al. .......... 714/752 |
| 2014/0012953 A1 | 1/2014 | Stoyanov |

FOREIGN PATENT DOCUMENTS

| | | |
|---|---|---|
| CN | 101247196 A | 8/2008 |
| CN | 201127081 Y | 10/2008 |
| CN | 101383763 A | 3/2009 |
| CN | 101695090 A | 4/2010 |
| CN | 101765003 A | 6/2010 |
| EP | 2073552 A1 | 6/2009 |

OTHER PUBLICATIONS

English Translation of the Written Opinion of the International Search Authority in international application No. PCT/CN2011/072976, mailed on Oct. 27, 2011.

Supplementary European Search Report in European application No. 11856157.0, mailed on Mar. 21, 2014.

\* cited by examiner

METHOD AND SYSTEM FOR SHARING AUDIO AND/OR VIDEO

TECHNICAL FIELD

The disclosure relates to the field of mobile communications, and more particularly, to a method and a system for sharing audio and/or video.

BACKGROUND

Digital Living Network Alliance (DLNA) is a cross-industry organization which consists of a plurality of companies leading consumer electronics industry, computer industry and mobile setting industry. The DLNA aims to share wired and wireless networks that are formed by indoor and outdoor interconnected consumer electronics, personal computers, mobile equipment and the like, thereby promoting the sharing of digital multimedia content and service. The DLNA devotes to launching an open industrial standard-based interconnection guideline to realize cross-industry digital convergence. The DLNA does not create a technology, but forms a solution and a standard which can be complied with. Therefore, various technologies and protocols selected by the DLNA are the technologies and the protocols which are applied very widely at present. The DLNA equipment must support a HyperText Transfer Protocol (HTTP) serving as a basic transmission mode to transmit multimedia content, for which, in addition, a Real-time Transport Protocol (RTP) can serve as an optional media transmission mode, but the HTTP as a mandatory requirement must be supported.

Streaming media refers to a media format played on the Internet by adopting a stream transmission mode. The streaming media is also called a streaming-type media, which refers to that a dealer sends out a program as a data packet to a network by using a video transmission server. After a user decompresses the data by decompression equipment, the program can be displayed. Three streaming media protocols, which are widely applied in current mobile internet, are an HTTP progressive download streaming media protocol, a Real Time Streaming Protocol (RTSP)/RTP-based real-time streaming media protocol stack, and a HTTP Live Streaming Protocol proposed by Apple Inc lately.

A video conference, which is also called a televised conference, a teleconference and the like, can transmit the information in the forms of moving images, audio and application data (electronic whiteboard and graphics) and the like between two points and among a plurality of points in real time. By the video conference, people can communicate more effectively, because visual communication is the most natural communication mode. Therefore, seeing can deepen the understanding and memory of people better than saying, particularly when the topic per se is a very figurative point of view, the video conference make the people in different places influence each other, no matter the distance between the people is 10 minutes' walk or 10 hours' airplane travel. The video conference can make people exchange ideas and exchange information as they are in the same room. This means that the people need not spend their working time in waiting E-mails, faxes or express.

By the DLNA, the terminal supporting the DLNA protocol can share pictures, videos, files and the like through the HTTP protocol conveniently. For example, the pictures on a mobile phone terminal are shared with a television for displaying. However, what shared by the DLNA is mainly the contents which have been stored in a digital terminal, while the media contents transmitted in a streaming mode cannot be shared by the DLNA at present.

SUMMARY

In view of the above, the main aim of the disclosure is to provide a method and a system for sharing audio and/or video. The audio and/or video can be shared between a mobile terminal and a digital home network terminal through the DLNA, so that user experience is improved.

The following technical solutions of the disclosure are provided.

A method for sharing the audio and/or video is provided, which includes the following steps.

A first terminal writes audio and/or video from an audio-video providing module into a cache space according to a play request of a second terminal, and transmits the audio and/or video stored in the cache space to the second terminal.

The step that the first terminal writes the audio and video from the audio-video providing module into the cache space includes the following steps: the first terminal synchronizes the audio-video according to time stamp information in a code stream of the audio and video RTP, and writes the synchronized audio-video into the cache space frame by frame.

The step that the first writes the audio and/or video from the audio-video providing module into the cache space includes the following steps: when the cache space is full, the first terminal stops writing data into the cache space; and when the cache space is not full, the first terminal continues writing the data into the cache space.

The step that the first terminal transmits the audio and/or video stored in the cache space to the second terminal includes the following steps: when the first terminal determines that the occupied space of the cache space is no greater than a set threshold, the first terminal stops transmitting the audio and/or video stored in the cache space to the second terminal until the occupied space of the cache space is greater than the set threshold, and then continues transmitting the audio and/or video stored in the cache space to the second terminal.

The first terminal is the mobile terminal. The second terminal is a home digital terminal. The audio-video providing module is a video conference server.

A system for sharing audio and/or video is provided, which includes a first terminal, a second terminal and an audio-video providing module.

The first terminal is configured to write audio and/or video from the audio-video providing module into a cache space according to a play request of the second terminal, and to transmit the audio and/or video stored in the cache space to the second terminal.

The first terminal writing the audio and video from the audio-video providing module into the cache space includes the follows: the first terminal synchronizes the audio-video according to the time stamp information in the code stream of the audio and video RTP, and writes the synchronized audio-video into the cache space frame by frame.

The first writing the audio and/or video from the audio-video providing module into the cache space includes the follows: when the cache space is full, the first terminal stops writing data into the cache space; and when the cache space is not full, the first terminal continues writing the data into the cache space.

The first terminal transmits the audio and/or video stored in the cache space to the second terminal includes the follows:

when the first terminal determines that the occupied space of the cache space is no greater than the set threshold, stops transmitting the audio and/or video stored in the cache space to the second terminal until the occupied space of the cache space is greater than the set threshold, and then continues transmitting the audio and/or video stored in the cache space to the second terminal.

The first terminal is a mobile terminal. The second terminal is a home digital terminal. The audio-video providing module is a video conference server.

According to the method and the system for sharing the audio and/or video, the first terminal writes the audio and/or video from the audio-video providing module into the cache space according to the play request of the second terminal, and transmits the audio and/or video stored in the cache space to the second terminal. In this way, the video conference of the mobile terminal can be displayed on the digital home network terminal in real time, so that the digital terminal that does not support video conferences can display the video content. Moreover, when a user gets home, the mobile phone terminal involved in the video conference can conveniently switch the images to a television terminal, thus not needing to be held by the user. Therefore, the user experience is improved.

DETAILED DESCRIPTION

The basic concept of the disclosure is that: the first terminal writes the audio and/or video from the audio-video providing module into the cache space according to the play request of the second terminal, and transmits the audio and/or video stored in the cache space to the second terminal.

The overall system of the video conference is mature, including the initiation and control of the video conference and the audio-video transmission. What the disclosure relates to is not the interaction process between a video conference terminal B and a video conference server A. In a similar way, because of the specification of the DLNA, the switch transmission between B and C and the discovery of equipment are controlled by the specification standard of the DLNA, which are therefore not included within the scope of the disclosure.

Actually, what the disclosure relates to is how to display on C images and video transmitted to the terminal B from A. Known from the DLNA protocol, if what stored on the B is a fixed video, it is easy share the fixed video on the C according to the DLNA specification. The disclosure focuses on how to share a dynamic video code stream transmitted from the A on the C successfully.

Figure 1:
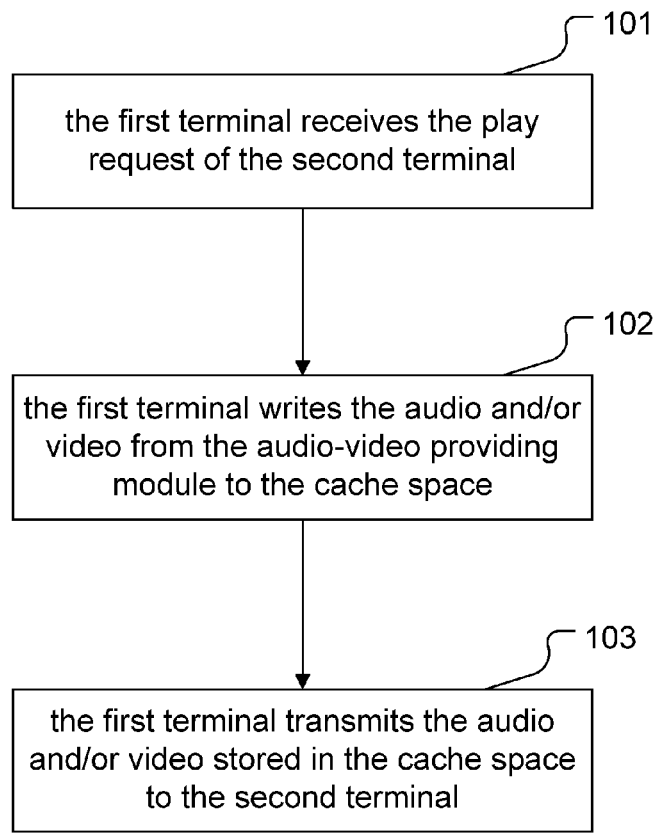
FIG. 1 shows a flow chart of the method for sharing the audio and/or video of the disclosure.

FIG. 1 shows the flow chart of the method for sharing the audio and/or video of the disclosure. As shown in FIG. 1, the method includes the following steps:

Step 101: the first terminal receives a play request of the second terminal.

For example, the mobile terminal receives a request about HTTP streaming media play from a home digital terminal.

Step 102: the first terminal writes the audio and/or video from the audio-video providing module into the cache space.

In the disclosure, the first terminal mainly refers to the mobile terminal (for example the mobile phone terminal); the second terminal mainly refers to the home digital terminal; and the audio-video providing module mainly refers to the video conference server.

Note that, for the situation that the audio-video providing module provides the audio and the video at the same time, the first terminal (correspondingly, the first terminal needs to be added with a module which is similar to a streaming media server) synchronizes the audio-video according to the time stamp information in the code stream of the audio and video RTP, and writes the synchronized audio-video into the cache space frame by frame. Generally, the cache space is a first-in first-out linearly structured cache, and the capacity of the cache space can be measured by the play length of the audio and/or video. For example, the cache space with the play length of 20 S is set on the mobile phone terminal.

When the cache space is full, the first terminal stops writing data into the cache space; and when the cache space is not full, the first terminal continues writing the data into the cache space. In practical application, a flag bit can be configured to identify whether the cache space is full or not, for example, when the flag bit is 1, the cache space is full; and when the flag bit is 0, the cache space is not full.

According to the DLNA protocol, the home digital terminal can transmits DLNA connection information in a broadcast mode. After the mobile terminal detects the DLNA connection information, the mobile terminal caches the audio and/or video from the audio-video providing module. Specifically, the mobile terminal cures a piece of file header information in a 3rd-generation platform (3GP) format at the very beginning section of the cache space, wherein the file header information includes an audio format (for example Adaptive Multi-Rate (AMR)) and/or a video format (for example Moving Picture Expert Group-4 (MEPG-4)) of the 3GP file to be written. After the mobile terminal receives the code stream of the audio and/or video RTP transferred from the video conference server, in a similar way, writes the audio and/or video into the cache space that is regarded as the file in the 3GP format until the cache space (for example 20 S) is full, at this time, the flag bit P is set as 1, and subsequently waits for the arrival of the flag bit P=0.

Note that, the sequence of the Step 101 and the Step 102 are not limited by the disclosure.

Step 103: the first terminal transmits the audio and/or video stored in the cache space to the second terminal.

Generally, the first terminal extracts the streamlining media information from the cache space in the mode of a streaming media server, and transmits the streaming media information to the second terminal frame by frame through the HTTP.

Note that, in the process of transmitting the audio and/or video, the first terminal determines whether the occupied space of the cache space is greater than the set threshold. When the first terminal determines that the occupied space of the cache space is no greater than the set threshold, stops transmitting the audio and/or video stored in the cache space to the second terminal until the occupied space of the cache space is greater than the set threshold, and then continues transmitting the audio and/or video stored in the cache space to the second terminal. In practical application, the flag bit can be configured to identify whether the occupied space of the cache space is greater than the set threshold, for example, when the flag bit is 1, the occupied space of the cache space is greater than the set threshold; and when the flag bit is 0, the occupied space of the cache space is no greater than the set threshold.

When the transmission of the streaming media is completed, the cache space needs to be emptied and waits for the next DLNA connection.

The disclosure further discloses a system for sharing the audio and/or video correspondingly. The system includes the first terminal, the second terminal and the audio-video providing module.

The first terminal is configured to write the audio and/or video from the audio-video providing module into the cache space according to the play request of the second terminal, and transmit the audio and/or video stored in the cache space to the second terminal.

The first terminal writing the audio and video from the audio-video providing module into the cache space includes that: the first terminal synchronizes the audio-video according to the time stamp information in the code stream of the audio and video RTP, and writes the synchronized audio-video into the cache space frame by frame.

The first terminal writing the audio and/or video from the audio-video providing module into the cache space includes that: when the cache space is full, the first terminal stops writing data into the cache space; and when the cache space is not full, the first terminal continues writing the data into the cache space.

The first terminal transmitting the audio and/or video stored in the cache space to the second terminal includes that: the first terminal determines that the occupied space of the cache space is no greater than a set threshold, stops transmitting the audio and/or video stored in the cache space to the second terminal until the occupied space of the cache space is greater than the set threshold, and then continues transmitting the audio and/or video stored in the cache space to the second terminal.

The first terminal is a mobile terminal. The second terminal is a home digital terminal. The audio-video providing module is a video conference server.

It can be seen that, by reforming the related modules of the video conference terminal, the audio and the video from the video conference server are converged together on the basis of the code stream of the RTP to form a module similar to the streamlining media server. The video content is shared and displayed on the digital home terminal according to the HTTP of the streaming media through the DLNA technology.

The implementation of the technical solution is described below with reference to specific embodiments in detail.

Figure 2:
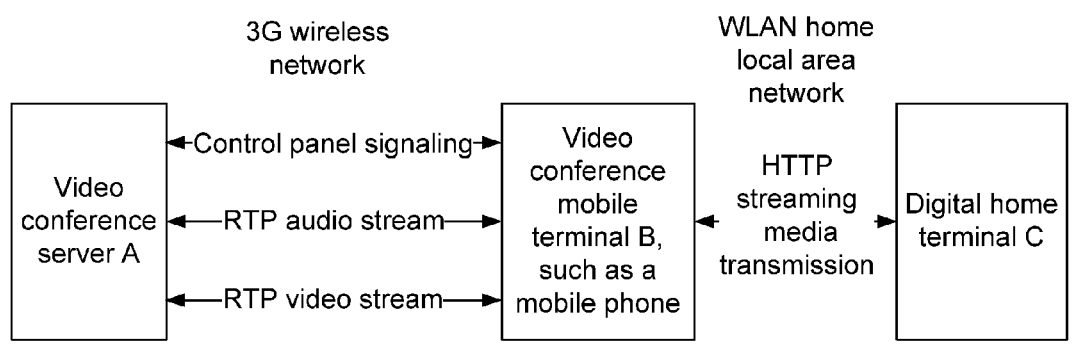
FIG. 2 shows a block diagram of the overall system of the embodiment of the disclosure.
Figure 3:
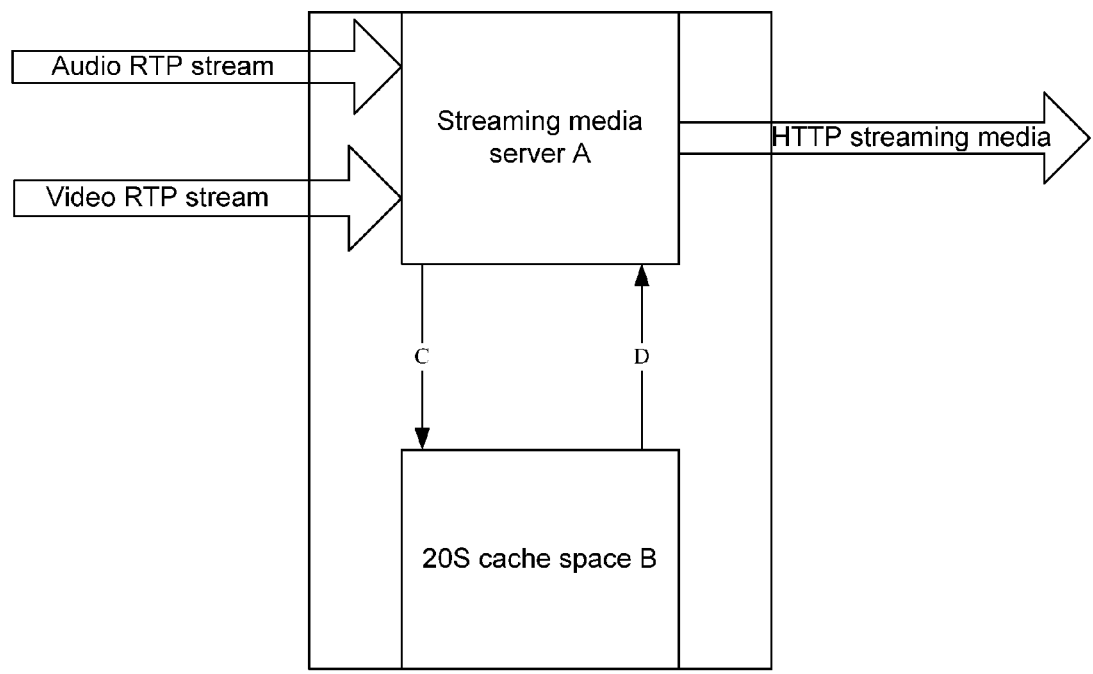
FIG. 3 shows a diagram of the solution for sharing a video conference of the embodiment of the disclosure.

The block diagram of the overall system of the embodiment of the disclosure is shown as FIG. 2, and the scheme for sharing the video conference is shown as FIG. 3. The embodiment of the disclosure includes the following steps that:

a) A mobile phone terminal A performs a 3rd-generation (3G) video conference outdoors, wherein various functions of the video conference are normal and both the audio and the video are opened. The video conference adopts the 3G network of a Universal Mobile Telecommunications System (UMTS). Moreover, the DLNA server of the mobile phone terminal is opened and can be captured by a client of other DLNAs. In addition, the Wireless Local Area Network (WLAN) of the mobile phone terminal is also opened.

b) The mobile phone terminal enters indoors. At this time, a wireless terminal detects the Access Point (AP) of the indoor WLAN, accesses into the AP of the WLAN automatically, and starts to connect the indoor wireless local area network. At this time, the indoor home information terminal, namely the television B is performing the DLNA network scanning, the television B initiates the DLNA broadcast information on the WLAN in a broadcast mode. After the mobile phone terminal A receives the DLNA broadcast information, because the mobile phone has a DLNA function, the mobile phone responds through the WLAN. The terminal B therefore finishes the discovery process of DLNA equipment and locates the mobile terminal A.

c) The terminal B initiates a video sharing request to the terminal A. After receiving the request, the streaming media server on the terminal A is started: firstly, the streamlining media server empties the 20 S cache information, and secondly, writes the header information of the 3GP file into the 20 S cache module, wherein the header information includes the video of MPEG-4 and the audio of AMR.

d) On one hand, display the received audio-video code streaming on the mobile phone terminal; and on the other hand, copy the received audio-video code streaming, and write the received audio-video code streaming into the 20 S cache according to the time stamp of each module.

e) when the data in the cache exceeds 5 S, the streaming media server starts responding to the request of the home digital terminal, starts to provides the streamlining media of the video conference for the home digital terminal, reads a piece of data in the cache in the HTTP mode, transmits the data through the HTTP, and reads continuously until the cache space is less than the length of 5 S.

Note that, when the cache space is not full, turn to the Step d, continue writing; in addition, when the cache space is greater than 5 S, restart the Step e, continue transmitting until the home digital terminal stops the sharing request or the video conference comes to an end, and then the overall process comes to an end, empties the cache space and resets all flag bits.

The above is only the preferred embodiment of the disclosure and not intended to limit the scope of protection of the disclosure.

The invention claimed is:

1. A method of sharing audio and/or video, comprising:
   writing, by a first terminal, audio and/or video from an audio-video providing module into a cache space, according to a play request of a second terminal, and transmitting the audio and/or video stored in the cache space to the second terminal;
   wherein the step of transmitting the audio and/or video stored in the cache space to the second terminal by the first terminal comprises:
   stopping transmitting the audio and/or video stored in the cache space to the second terminal, when the first terminal determines that an occupied space of the cache space is no greater than a set threshold, until the occupied space of the cache space is greater than the set threshold, and then continuing transmitting the audio and/or video stored in the cache space to the second terminal.

2. The method according to claim 1, wherein the step of writing the audio and video from the audio-video providing module into the cache space by the first terminal comprises:
   synchronizing, by the first terminal, the audio-video according to time stamp information in a code stream of an audio and video Real-time Transport Protocol (RTP), and writing the synchronized audio-video into the cache space frame by frame.

3. The method according to claim 1, wherein the step of writing the audio and/or video from the audio-video providing module into the cache space by the first terminal comprises:
   when the cache space is full, stopping writing data into the cache space by the first terminal; and
   when the cache space is not full, continuing writing the data into the cache space by the first terminal.

4. The method according to claim 1, wherein the first terminal is a mobile terminal, the second terminal is a home digital terminal, and the audio-video providing module is a video conference server.

5. A system for sharing audio and/or video, comprising a first terminal, a second terminal and an audio-video providing module, wherein
the first terminal is configured to write audio and/or video from the audio-video providing module into a cache space according to a play request of the second terminal, and to transmit the audio and/or video stored in the cache space to the second terminal;
wherein the first terminal transmitting the audio and/or video stored in the cache space to the second terminal comprises:
the first terminal stopping transmitting the audio and/or video stored in the cache space to the second terminal, when the first terminal determines that an occupied space of the cache space is no greater than a set threshold, until the occupied space of the cache space is greater than the set threshold, and then continuing transmitting the audio and/or video stored in the cache space to the second terminal.

6. The system according to claim 5, wherein the first terminal writing the audio and video from the audio-video providing module into the cache space comprises: the first terminal synchronizing the audio-video according to time stamp information in a code stream of an audio and video Real-time Transport Protocol (RTP), and writing the synchronized audio-video into the cache space frame by frame.

7. The system according to claim 5, wherein the first terminal writing the audio and/or video from the audio-video providing module into the cache space comprises:
when the cache space is full, the first terminal stopping writing data into the cache space; and
when the cache space is not full, the first terminal continuing writing the data into the cache space.

8. The system according to claim 5, wherein the first terminal is a mobile terminal, the second terminal is a home digital terminal, and the audio-video providing module is a video conference server.

9. The method according to claim 2, wherein the first terminal is a mobile terminal, the second terminal is a home digital terminal, and the audio-video providing module is a video conference server.

10. The method according to claim 3, wherein the first terminal is a mobile terminal, the second terminal is a home digital terminal, and the audio-video providing module is a video conference server.

11. The system according to claim 6, wherein the first terminal is a mobile terminal, the second terminal is a home digital terminal, and the audio-video providing module is a video conference server.

12. The system according to claim 7, wherein the first terminal is a mobile terminal, the second terminal is a home digital terminal, and the audio-video providing module is a video conference server.

* * * * *